US010336242B2

(12) United States Patent
Canonne et al.

(10) Patent No.: US 10,336,242 B2
(45) Date of Patent: Jul. 2, 2019

(54) VEHICLE LIGHTING DEVICE WITH PRESENTATION OF DRIVING ASSISTANCE INFORMATION

(71) Applicant: VALEO VISION, Bobigny (FR)

(72) Inventors: Thomas Canonne, Poissy (FR); Antoine De Lamberterie, Paris (FR); Guillaume Thin, Guyancourt (FR); Samira Mbata, Aubervilliers (FR); Olivier-Sebastien Lesaffre, Pantin (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 15/441,959

(22) Filed: Feb. 24, 2017

(65) Prior Publication Data
US 2017/0246983 A1 Aug. 31, 2017

(30) Foreign Application Priority Data

Feb. 26, 2016 (FR) .................................... 16 51633

(51) Int. Cl.
*B60Q 1/08* (2006.01)
*B60Q 1/00* (2006.01)
*H04L 29/08* (2006.01)
*B60Q 1/02* (2006.01)
(Continued)

(52) U.S. Cl.
CPC ............... *B60Q 1/08* (2013.01); *B60K 35/00* (2013.01); *B60K 37/06* (2013.01); *B60Q 1/0076* (2013.01); *B60Q 1/02* (2013.01); *H04L 67/36* (2013.01); *B60K 2350/355* (2013.01); *B60K 2350/357* (2013.01); *B60K 2350/924* (2013.01); *B60K 2350/946* (2013.01); *B60Q 2400/50* (2013.01)

(58) Field of Classification Search
CPC ...... B60Q 1/50; B60Q 1/503; B60Q 2400/50; G03B 21/204
See application file for complete search history.

(56) References Cited

U.S. PATENT DOCUMENTS

| 7,375,621 | B1* | 5/2008 | Hines | ..................... B60Q 9/005 |
| | | | | 340/435 |
| 2012/0044090 | A1* | 2/2012 | Kahler | ..................... B60Q 1/50 |
| | | | | 340/905 |
| 2013/0058116 | A1 | 3/2013 | Galbas et al. | |

(Continued)

FOREIGN PATENT DOCUMENTS

| DE | 10 2012 025 354 A1 | 7/2014 |
| EP | 2 562 039 A2 | 2/2013 |
| EP | 2 772 682 A2 | 9/2014 |

OTHER PUBLICATIONS

French Preliminary Search Report dated Dec. 15, 2016 in Patent Application No. 1651633 (with English translation of categories of cited documents).

*Primary Examiner* — Cara E Rakowski
*Assistant Examiner* — Christpher A Lamb, II
(74) *Attorney, Agent, or Firm* — Oblon, McClelland, Maier & Neustadt, L.L.P.

(57) ABSTRACT

A lighting device of a vehicle includes at least one lighting device for a road scene in front of the vehicle arranged to form a first light beam defined by a first lighting. A device for generating a second light beam defined by a second lighting is configured to superimpose the second beam on the first light beam. A sum of the first lighting and of the second lighting is greater than the first lighting, the second light beam forms driving assistance information.

16 Claims, 3 Drawing Sheets

(51) Int. Cl.
*B60K 35/00* (2006.01)
*B60K 37/06* (2006.01)

(56) References Cited

U.S. PATENT DOCUMENTS

| | | | |
|---|---|---|---|
| 2015/0375672 A1* | 12/2015 | Takahashi | G02B 6/0068 |
| | | | 701/49 |
| 2016/0031366 A1* | 2/2016 | White | B60Q 1/503 |
| | | | 353/13 |
| 2016/0039286 A1* | 2/2016 | Shibata | B60K 35/00 |
| | | | 701/36 |
| 2017/0038021 A1* | 2/2017 | Garcia Gutierrez | B62J 6/02 |
| 2017/0038582 A1* | 2/2017 | Chau | G02B 27/0101 |
| 2017/0043705 A1* | 2/2017 | Mizuno | F21S 41/645 |
| 2018/0056854 A1* | 3/2018 | Kunii | B60Q 1/26 |
| 2018/0118095 A1* | 5/2018 | Kunii | B60Q 1/26 |

* cited by examiner

VEHICLE LIGHTING DEVICE WITH PRESENTATION OF DRIVING ASSISTANCE INFORMATION

BACKGROUND

The field of the present invention is that of lighting devices for a motor vehicle, such as a headlight with which the motor vehicle is equipped.

The vehicle lighting devices are conventionally used to project onto the road in front of the vehicle a lighting beam which enables the driver of the vehicle to drive in complete safety in night-time conditions.

These lighting devices are designed to light the road to a minimum regulatory distance for a high beam function and for a low beam function. This minimum distance, for example 300 meters for a high beam function, results in constraints in the light beam, notably in a portion of the beam situated between 3 and 15 meters in front of the vehicle.

In effect, to guarantee that a minimum lighting required at 300 meters is achieved, this lighting is often very great in the portion situated between 3 and 15 meters. Now, this is also regulated since the lighting in this area must not hamper the driver of the vehicle, notably by risking reducing the impression of long distance reach of the beam and/or risking dazzling the users other than the driver, by reflection on the surface of the wet road taken by the vehicle. The lighting in this portion situated between 3 and 15 meters in front of the vehicle is thus limited to 12 000 candelas at −4° measured along a horizontal axis in a vertical plane.

In the prior art devices, it is common practice to achieve this limit value of 12 000 candelas between 3 and 15 meters in order to succeed in providing the minimum lighting required at 300 meters.

In parallel with this situation, it is increasingly desirable to use the lighting beam of the vehicle to embed driving assistance information therein.

Now, when the portion of the beam situated between 3 and 15 meters is at the maximum tolerated lighting, it becomes impossible to embed an image by positive contrast. The only means available is then a negative contrast, but the latter is effective only if the information is delimited by an absence of light in the beam. In such a case, the area where the information is displayed is deprived of light and any road element in this area then becomes invisible to the driver. If for example, a pot hole deforms the road and the information covers this pot hole, the latter will be invisible to the driver who will not therefore be able to avoid it.

It is thus important to find another way of making the information visible in the beam while maintaining a level of safety for the driver of the vehicle.

BRIEF SUMMARY

The invention solves this technical problem by proposing a lighting device for a motor vehicle which offers sufficient visibility of the road scene and which can display, in the beam, driving assistance information that the driver will be easily able to detect while not affecting his/her level of safety.

The aim of the present invention is therefore to design a lighting device for a vehicle comprising at least one lighting means for a road scene in front of the vehicle arranged to form a first light beam defined by a first lighting, and a device for generating a second light beam defined by a second lighting configured to superimpose the second beam on the first light beam, characterized in that a sum of the first lighting and of the second lighting is greater than the first lighting and in that the second light beam forms driving assistance information.

In other words, that means that the second beam exhibits a non-zero lighting and more particularly that the lighting of the driving assistance information is greater than the lighting of the first light beam. The first beam thus forms a light background with respect to the information which is projected onto at least a part thereof. The part of the first light beam onto which the information is projected is a limited portion of the first light beam. More specifically, the information is projected at the level of the road scene.

"Driving assistance information" should be understood to cover any type of information drawing the attention of the driver. The latter may for example relate to the safety, hazards, notably by highlighting for example the sidewalk of the road taken by the vehicle, or even information linked to the driving, such as a speed or a direction.

Such a design offers numerous advantages.

Firstly, it makes it possible to display in the light beam driving assistance information that the driver can detect perfectly, since its contrast with the background makes it visible while retaining a sufficient lighting to observe the road as such, and to detect its imperfections, in particular.

Secondly, it makes the light beam uniform along the axis of projection between a short distance vision and a long distance vision, which gives visual comfort which had not yet hitherto been achieved. In effect, this uniformity limits the risk of glare that the short distance light can generate, notably when driving on a wet road. Furthermore, the uniformity of the light beam makes it possible to give a better impression of reach of the beam at long distance.

Uniformity of the beam should be understood to mean that the lighting of the beam is constant over a given lighting distance projected onto the ground of the load lit by the device according to the invention.

According to different features of the invention taken alone or in combination, it will be possible to make the following provisions:

- The lighting of the first beam in a portion of the road scene lying between three meters and fifteen meters in front of the vehicle lies between 20 lux and 50 lux and will notably be equal to 30 lux, for that the lighting means can be arranged for the lighting of the first beam to be constant in this portion of the road scene.
- The lighting of the second beam in a portion of the road scene lying between three meters and fifteen meters in front of the vehicle lies between 30 lux and 150 lux,
- The lighting of the second beam is greater than the lighting of the first beam,
- These lighting levels of the first and of the second beams make it possible to distinguish the information projected by the second beam onto a background formed by the first beam.
- A contrast between the first and the second light beams is greater than or equal to zero, it can lie between 0 exclusive and 5, and more specifically between 2 and 4. These lighting differences make it possible to ensure a better legibility of the information projected onto the first beam by positive contrast.
- The lighting means and the device for generating the second beam are formed by at least one same assembly comprising at least one light source emitting a beam of light rays, a scanning system receiving the beam of light rays and distributing it over a surface of a wavelength conversion device or a same assembly comprising at least one uniform light source and one LCD screen or micro-mirrors.

A uniform light source should be understood to be a surface light source which is distinguished from a pixelated source in that it is not divided into several light source units. The LCD screen then comprises a matrix of liquid crystals that can be arranged in front of the uniform light source and which makes it possible to modulate the transmission of light originating from this light source.

The lighting means and the device for generating the second beam share at least one same light source which generates the first light beam and the second light beam, the light source is pixelated and can be formed by a matrix of individual light sources which extend in a same plane and whose intensity can be controlled individually, The lighting means comprises at least one optical system whose focal plane coincides with the plane in which the individual light sources extend.

Another subject of the invention is a motor vehicle headlight comprising a lighting device as previously defined.

The invention can also cover a vehicle lighting device comprising at least one means for lighting the road scene in front of the vehicle arranged to form at least one first light beam, characterized in that the lighting of the first beam is constant in a portion of the road scene lying between 3 meters and 15 meters in front of the vehicle, notably along an axis of displacement of the vehicle.

Thus, the invention makes it possible to ensure a uniform light background at short distance in front of the vehicle. This uniform light background at short distance makes it possible, among other things to give an impression of greater reach of the light beam, which makes it possible to provide the driver with better visual comfort.

In such a case, the lighting of the first beam in the portion of the road scene lying between 3 meters and 15 meters in front of the vehicle lies between 20 lux and 50 lux, and in which the lighting of the first beam in a portion of the road scene situated at between 200 and 300 meters in front of the vehicle lies between 0.5 lux and 2 lux.

BRIEF DESCRIPTION OF THE DRAWINGS

Other features, details and advantages of the invention will emerge more clearly on reading the description given hereinbelow by way of indication in relation to the drawings in which.

DETAILED DESCRIPTION

It must first of all be noted that the figures explain the invention in detail to implement the invention, said figures naturally being able to be used to better define the invention if necessary.

Figure 1:
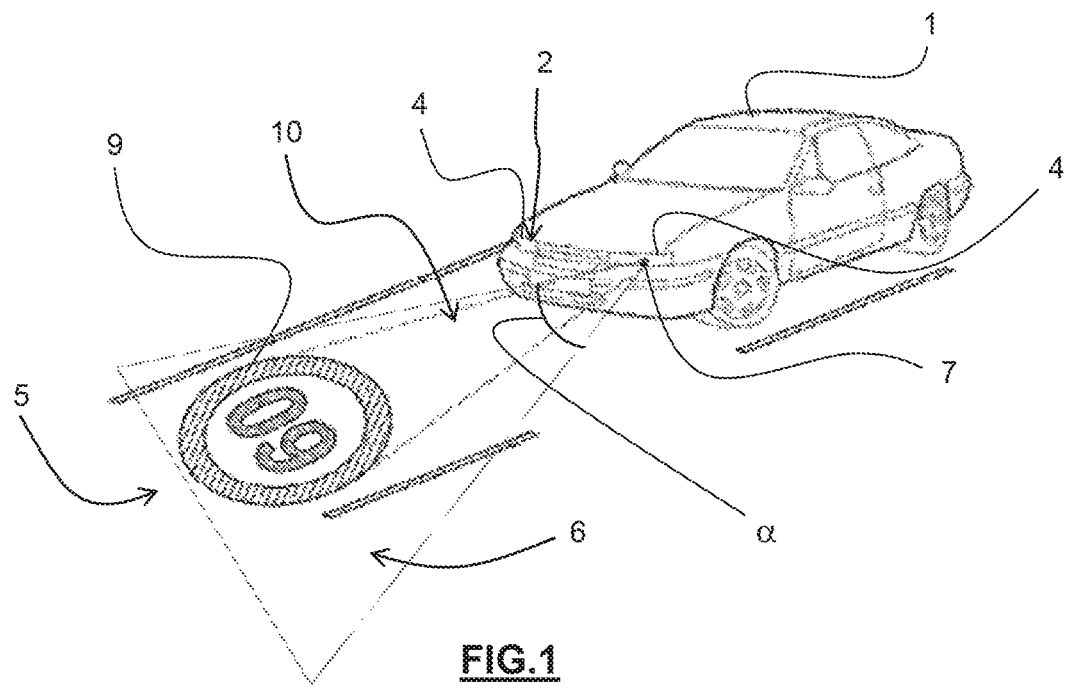
FIG. 1 is a perspective view of a vehicle provided with a lighting device according to the present invention.

FIG. 1 schematically represents a motor vehicle 1 provided with at least one lighting device 2, each comprising at least one lighting means 4 for a road scene 5 situated in front of the vehicle 1. "Front of the vehicle" defines the front part thereof situated facing the road scene when the vehicle is moving forward.

The lighting means 4 are arranged so as to form a first light beam 6. Advantageously, the first beam 6 is regulatory. A beam is considered to be regulatory when it meets a national or a community regulation setting a photometric grid to be observed. By way of example for a headlight, the first light beam may observe the European regulations ECE R98, ECE R112, ECE R113 or ECE R123, in their latest amendments coming into force on Dec. 9, 2015 at the latest and/or the American regulations like the "Federal Motor Vehicle Safety Standard 108" (FMVSS 108) whose latest amendment came into force on Dec. 15, 2015. According to these regulations, the first light beam can notably be a high beam or a low beam.

Thus, the first light beam 6 exhibits a first lighting corresponding to a light intensity less than 12 000 Candelas (Cd), according to an angle $\beta$ of less than four degrees relative to a reference straight line situated at the height of the headlight. This reference straight line forms the optical axis of the lighting device 2. The vertical angle $\beta$ extends in a vertical plane passing through the optical axis. This optical axis for example crosses the lighting means 4 of the vehicle 1. According to this vertical angle, a distance D of at least fifteen meters in front of the vehicle is lit by the first light beam 6, when the lighting means 4 generates a low beam.

The lighting device 2 also comprises at least one device 7 for generating a second light beam 10. This device 7 for generating the second beam 10 is configured to superimpose the second light beam 10 on the first light beam 6. The second beam 10 exhibits a second lighting and forms a driving assistance information 9. Advantageously, the superimposition of the light beams 6, 10 is regulatory.

The driving assistance information 9 concerns, for example, the speed of the vehicle, signaling information or even information guiding the driver of the vehicle 1. The driving assistance information 9 exhibits a lighting greater than the lighting of the first light beam 6. In other words, the sum of the lightings of the first beam 6 and of the second beam 10 is greater than the lighting of the first beam 10. A contrast between the background formed by the first light beam 6 and the information 9 formed by the second light beam 10 is provided by the different lighting values generated between the device 7 for generating the second beam 10 and the lighting means 4.

Figure 2:
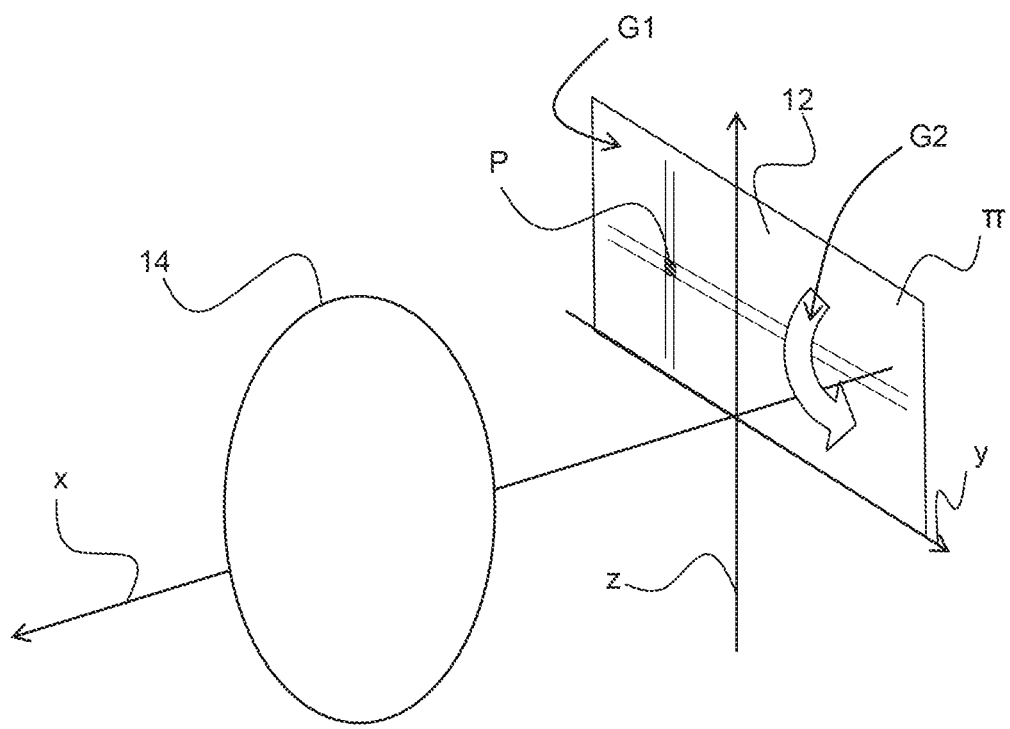
FIG. 2 is a schematic view of an exemplary embodiment of a light source used by the present invention.

According to an exemplary embodiment illustrated in FIG. 2, the lighting means and the device for generating the second beam 10 here share a same light source 12 which generates at the same time the first light beam and the second light beam. FIG. 2 shows an embodiment of the light source 12 which takes the form of a matrix of pixelated light sources. This matrix comprises a multitude of pixels P located in a plane $\pi$ which extends here in two directions (y, z). The pixels P are horizontally aligned according to the y axis and vertically according to the z axis. In this exemplary embodiment, a first group of pixels G1 of the matrix is intended to form the first beam 6 and a second group of pixels G2 is intended to form the second beam 10. Thus, here, the second group of pixels G2 is likened to the generation device 7. According to this embodiment, each pixel P can be controlled individually and so the light intensity and the lighting can be controlled in on or off mode or linearly.

According to a variant embodiment, the light source 12 can be of DMD type ("digital mirror device") in which the rotational modulation of micro-mirrors makes it possible to obtain a desired light intensity in a given direction.

According to another variant embodiment, the light source 12 can be of LCD type (liquid crystal display) comprising a surface light source in front of which liquid crystals are placed. The movement of the liquid crystals allows or prevents the passage of light and thus forms a pixelated light source 12.

According to yet another embodiment of the invention, the light source 12 is of laser type sending a beam of light rays to a scanning system which distributes it over the surface of a wavelength conversion device, such as a plate comprising a luminophor.

The light source 12 can be associated with an optical system 14 for projecting light onto the road scene. In an embodiment using the matrix of pixels as a light source 12, the optical system 14 exhibits a focus area coinciding with the plane π of the matrix of pixels, that is to say coinciding with the light source 12.

When it is possible, the light intensity of the road scene as the lighting device 2 according to the invention makes it possible, it also becomes possible to optimize the uniformity of the lighting of the first beam 6 and of the second beam 10. Homogeneity or uniformity of the beam should be understood to mean that the lighting of the beam is constant over a given lighting distance measured on the ground.

Figure 3:
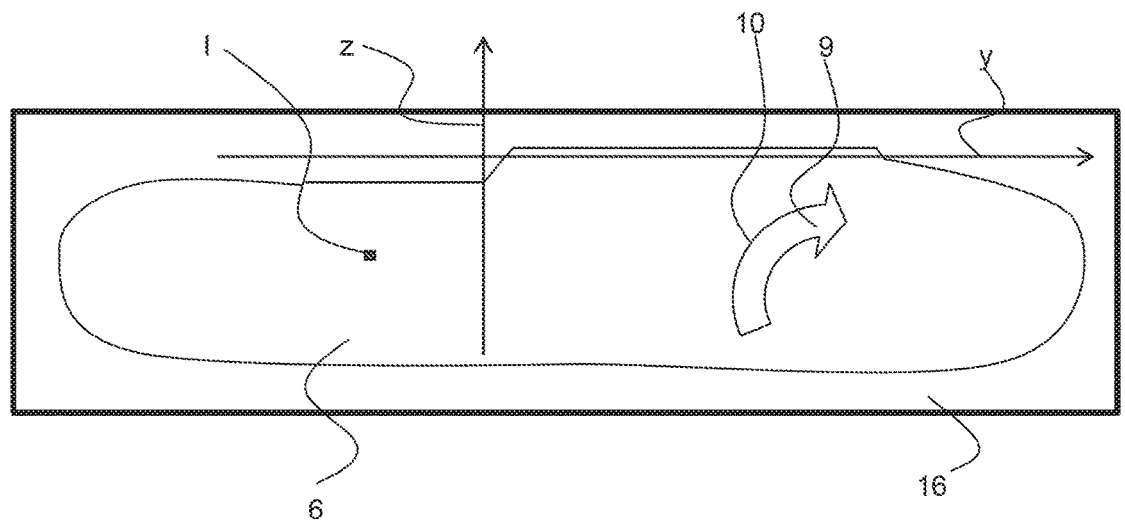
FIG. 3 represents the image of the light beam produced by the lighting device according to the present invention projected onto a screen situated at 25 meters in front of the vehicle and at right angles to the main axis of the beam.

FIG. 3 represents an example of the image of the first light beam 6 and of the second light beam 10 obtained from the lighting means 4 projected onto a screen 16 placed at right angles to the optical axis at 25 meters in front of the vehicle 1. An image I of the pixel of the light source exhibits a lighting proportional to the luminance of the pixel, and the same applies for the information 9 formed by the second beam 10.

The lighting means is arranged so that the lighting of the first beam 6 and the lighting of the second beam 10 are constant in a portion of the road scene 5 lying between three meters and fifteen meters in front of the vehicle. The light intensity follows the following law in a given direction for each light beam 6, 10:

$$I(\alpha,\beta)=E\times D^2$$

where E corresponds to the lighting of the beam expressed in lux, D corresponds to the distance separating the light means 4 and the point of ground impact associated with the direction ($\alpha$, $\beta$).

In this way, the light intensity makes it possible to ensure a uniform lighting of the ground by the first beam 6. The lighting of the first beam 6 in a portion of the road scene 5 lying between three and fifteen meters in front of the vehicle 1 then lies between 20 lux and 50 lux, which corresponds to a light intensity lying between 2000 Cd and 5000 Cd at ten meters. Preferably, the lighting of the first beam 6 is equal to 30 lux. Furthermore, the lighting of the first beam 6 in a portion of the road scene 5 situated at 300 meters in front of the vehicle lies between 0.5 lux and 2 lux.

Figure 4:
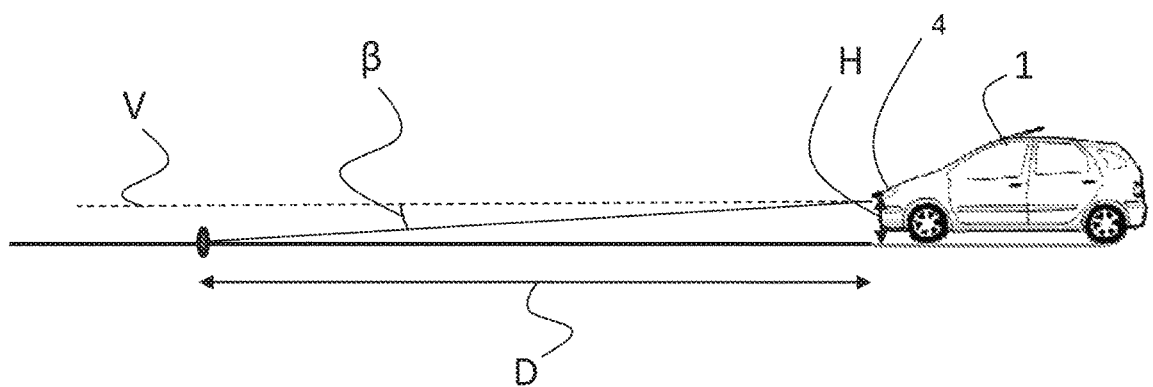
FIG. 4 is a side view of a road and of a vehicle positioned on this road, provided with a lighting device according to the present invention.

As is shown in FIG. 4, the direction ($\alpha$, $\beta$) is defined by the angles $\alpha$ et $\beta$. The horizontal angle $\alpha$ corresponds to the angle formed by the beam measured in a horizontal plane relative to the optical axis of the beam. In other words, the angle $\alpha$ makes it possible to light a greater or lesser portion of the road. Preferably, the angle $\alpha$ takes a value lying between −40° and 40°. The vertical angle $\beta$ corresponds to the angle formed by the beam relative to the reference straight line V situated at the height of the headlight, forming the optical axis of the headlight. The angle $\beta$ makes it possible to light a portion of road more or less distant from the headlight. The angle $\beta$ can take a value lying between −10° and −4°.

The light intensity of the first light beam 6 and of the second light beam 10 can be controlled as a function of the vertical angle $\beta$. In effect, as FIG. 4 shows:

$$\tan(\beta)=H/D$$

where $\beta$ corresponds to the vertical angle as previously defined, H corresponds to the height of the headlight on the vehicle 1 relative to the ground, and D corresponds to the distance between the point of impact of the first beam 6 or of the second beam 10 on the ground for a given vertical angle $\beta$.

Thus, between three and fifteen meters in front of the vehicle, the law I ($\alpha$, $\beta$)=E×D² becomes $$I(\alpha,\beta)=E\times(H/\tan(\beta))^2.$$

In these conditions, the lighting on the ground becomes E=I/D² and corresponds to a constant for a given intensity and distance. The lighting is therefore uniform for each of the beams 6, 10.

In order to observe the regulatory standards, it is best to not exceed a light intensity of the first beam 6 of 6000 Cd maximum in order to allow the creation of the driving assistance information 9 by the second beam 10 by positive contrast with the contrast lying between 0 and 5, 0 being excluded. The outline contrast formula corresponds to:

$$(LMAX-LMIN)/LMIN$$

where LMAX corresponds to the luminance resulting from the sum of the first beam 6 and the second beam 10, and LMIN corresponds to the luminance of the first beam 6. In other words, LMAX corresponds to the luminance of the driving assistance information 9.

Since the luminance is directly proportional to the light intensity, a contrast of one is obtained corresponding to a first beam 6 of 6000 Cd and a second beam of 6000 Cd, and the luminance of the sum of the beams 6 and 10 is equal 12 000 Cd. A contrast of two corresponds to a first beam 6 of 4000 Cd and a second beam 10 of 8000 Cd, and thus the luminance of the sum of the beams 6 and 10 is equal to 12 000 Cd. A contrast of three corresponds to a first beam 6 of 3000 Cd and a second beam 10 of 9000 Cd, and the luminance of the sum of the beams 6 and 10 is equal to 12 000 Cd. A contrast of four corresponds to a first beam 6 of 2400 Cd and a second beam 10 of 9600 Cd, and the luminance of the sum of the beams 6 and 10 is equal to 12 000 Cd. A contrast of five corresponds to a first beam 6 of 2000 Cd and a second beam 10 of 10 000 Cd, and the luminance of the sum of the beams 6 and 10 is equal 12 000 Cd.

Thus, the contrast is situated between 0 exclusure and 5, and ideally between 2 and 4 in order to obtain information 9 exhibiting sharp outlines relative to the first beam 6. A contrast between 2 and 4 corresponds substantially to an intensity of the first beam 6 of 4000 Cd with an intensity of the second beam 10 between 8000 and 9600 Cd, while observing the regulatory standards.

These light intensities correspond to a lighting of the second beam 10 in a portion of the road scene 5 lying between 3 meters and 15 meters in front of the vehicle 1 lying between 30 lux and 150 lux. The lighting of the second beam 10 can be greater than the lighting of the first beam 6 which makes it possible to have information 9 that is particularly easy to distinguish while retaining a beam which lights the road taken by the vehicle equipped with the invention. Such a contrast between the background formed by the first light beam 6 and the information 9 formed by the second light beam 10 is provided by the lighting difference generated by the device 7 for generating the information 9 and the lighting means 4.

Figure 5:
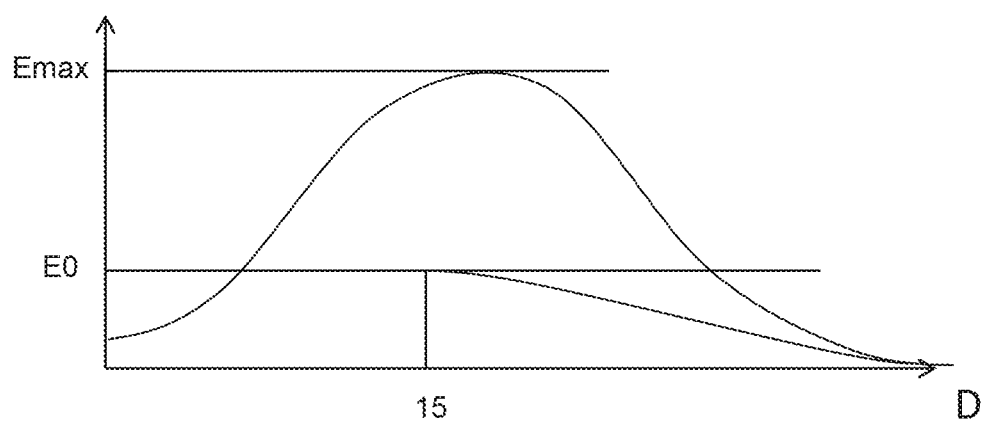
FIG. 5 is a graph representing the lighting of a lighting device according to the prior art compared to the lighting provided by a lighting device according to the invention, as a function of the distance separating the lighting device according to the invention and the point of ground impact on the road.

As the graph of FIG. 5 shows, a curve passing through a lighting Emax illustrates the lighting generated by a lighting device of the prior art. This curve is a bell curve with a maximum lighting substantially at fifteen meters. On the other hand, the lighting E0 generated by a lighting device according to the invention is constant up to fifteen meters then decreases gradually for longer distances. This makes it possible to provide, firstly, a controlled and uniform lighting for near light and, secondly, a reduced level of light on the ground which limits the glare effects for the users in case of a wet road. An electrical consumption of the lighting device is also optimized in as much as there is no excess light in areas of the road scene that do not require strong lighting.

The invention claimed is:

1. A lighting device of a vehicle comprising:
   at least one lighting means for a road scene in front of the vehicle, arranged to form a first light beam defined by a first lighting, and
   a device for generating a second light beam defined by a second lighting configured to superimpose the second beam on the first light beam, in which a sum of the first lighting and of the second lighting is greater than the first lighting and in which the second light beam forms driving assistance information,
   wherein the second lighting of the second light beam is greater than the first lighting of the first light beam, and
   wherein a contrast between the first and the second light beams lies between zero exclusive and five, the contrast being calculated according to the following equation:

(LMAX−LMIN)/LMIN,

LMAX being a luminance resulting from a sum of the first light beam and the second light beam, and
   LMIN being a luminance of the first light beam.

2. The lighting device according to claim 1, wherein the lighting of the first beam in a portion of the road scene lying between three meters and fifteen meters in front of the vehicle lies between 20 lux and 50 lux.

3. The lighting device according to claim 1, wherein the lighting of the first beam is equal to 30 lux.

4. The lighting device according to claim 1, wherein the lighting means is arranged with the lighting of the first beam to be constant in a portion of the road scene lying between three meters and fifteen meters in front of the vehicle.

5. The lighting device according to claim 1, wherein the lighting of the second beam in a portion of the road scene lying between three meters and fifteen meters in front of the vehicle lies between 30 lux and 150 lux.

6. The lighting device according to claim 1, wherein the lighting means and the device for generating the second beam share at least one same light source which generates the first light beam and the second light beam.

7. The lighting device according to claim 6, wherein the light source is pixelated.

8. The lighting device according to claim 7, wherein the light intensity of a plurality of light sources can be controlled individually.

9. The lighting device according to claim 7, in which the light source is formed by a matrix of individual light sources which extend in a same plane ($\pi$).

10. The lighting device according to claim 9, wherein the lighting means comprises at least one optical system whose focal plane coincides with the plane ($\pi$) in which the individual light sources extend.

11. The lighting device according to claim 1, wherein the lighting means and the device for generating the second beam are formed by at least one same assembly comprising at least one light source emitting a beam of light rays, a scanning system receiving the beam of light rays and distributing it over a surface of a wavelength conversion device.

12. The lighting device according to claim 1, wherein the lighting means and the device for generating the second beam are formed by at least one same assembly comprising a uniform light source and an LCD screen.

13. The lighting device according to claim 1, wherein the lighting means and the device of the second beam are formed by at least one same assembly comprising a uniform light source and micro-mirrors.

14. The lighting device according to claim 1, wherein the second light beam is configured to be superimposed on the first light beam in at least a part of the first light beam, this part corresponding to an area of the road scene.

15. A headlight of a motor vehicle comprising:
   the lighting device according to claim 1.

16. The lighting device according to claim 1, wherein an intensity of the first light beam is 400 Cd and an intensity of the second light beam is between 8000 and 9600 Cd.

* * * * *